US008135057B2

United States Patent
Mondragon-Torres et al.

(10) Patent No.: US 8,135,057 B2
(45) Date of Patent: *Mar. 13, 2012

(54) RECONFIGURABLE CHIP LEVEL EQUALIZER ARCHITECTURE

(75) Inventors: Antonio F. Mondragon-Torres, Murphy, TX (US); Steven P. Pekarich, Rowlett, TX (US); Timothy M. Schmidl, Dallas, TX (US); Gibong Jeong, San Diego, CA (US); Aris Papasakellariou, Dallas, TX (US); Anand G. Dabak, Plano, TX (US); Eko N. Onggosanusi, Allen, TX (US)

(73) Assignee: Texas Instruments Incorporated, Dallas, TX (US)

( * ) Notice: Subject to any disclaimer, the term of this patent is extended or adjusted under 35 U.S.C. 154(b) by 2288 days.

This patent is subject to a terminal disclaimer.

(21) Appl. No.: 10/699,707

(22) Filed: Nov. 3, 2003

(65) Prior Publication Data

US 2004/0127164 A1 Jul. 1, 2004

Related U.S. Application Data

(60) Provisional application No. 60/435,529, filed on Dec. 20, 2002.

(51) Int. Cl.
*H03H 7/30* (2006.01)
(52) U.S. Cl. ........ 375/232; 375/230; 375/231; 375/233; 375/229; 375/347; 375/234; 375/316; 375/349

(58) Field of Classification Search ............... 375/230, 375/231, 232, 233, 229, 347
See application file for complete search history.

(56) References Cited

U.S. PATENT DOCUMENTS

| | | | | |
|---|---|---|---|---|
| 4,811,360 | A * | 3/1989 | Potter | 375/231 |
| 5,642,382 | A * | 6/1997 | Juan | 375/232 |
| 5,644,597 | A * | 7/1997 | Ueda | 375/232 |
| 5,670,916 | A * | 9/1997 | Korn | 333/18 |
| 5,722,063 | A * | 2/1998 | Peterzell et al. | 455/287 |
| 6,763,074 | B1 * | 7/2004 | Yang | 375/328 |
| 7,027,503 | B2 * | 4/2006 | Smee et al. | 375/233 |
| 7,039,097 | B2 * | 5/2006 | Terao | 375/148 |
| 7,320,062 | B2 * | 1/2008 | Master et al. | 712/15 |
| 7,561,618 | B2 * | 7/2009 | Mondragon-Torres et al. | 375/232 |
| 2003/0101408 | A1 * | 5/2003 | Martinian et al. | 714/776 |
| 2003/0133424 | A1 * | 7/2003 | Liang et al. | 370/335 |
| 2003/0133493 | A1 * | 7/2003 | Suzuki et al. | 375/130 |
| 2005/0243955 | A1 * | 11/2005 | Mondragon-Torres et al. | 375/347 |

* cited by examiner

*Primary Examiner* — Siu Lee
(74) *Attorney, Agent, or Firm* — Ronald O. Neerings; Wade James Brady, III; Fredrick J. Telecky, Jr.

(57) ABSTRACT

A reconfigurable chip level equalizer having circuitry that restores signal orthogonality and eliminates channel interference for a wireless transmitted signal. In at least some embodiments, the reconfigurable chip level equalizer comprises two or more adaptive equalizers, a plurality of operational blocks that interconnect the two or more adaptive equalizers, and a control mechanism that configures the two or more adaptive equalizers and operational blocks according to different signal delay profiles.

16 Claims, 13 Drawing Sheets

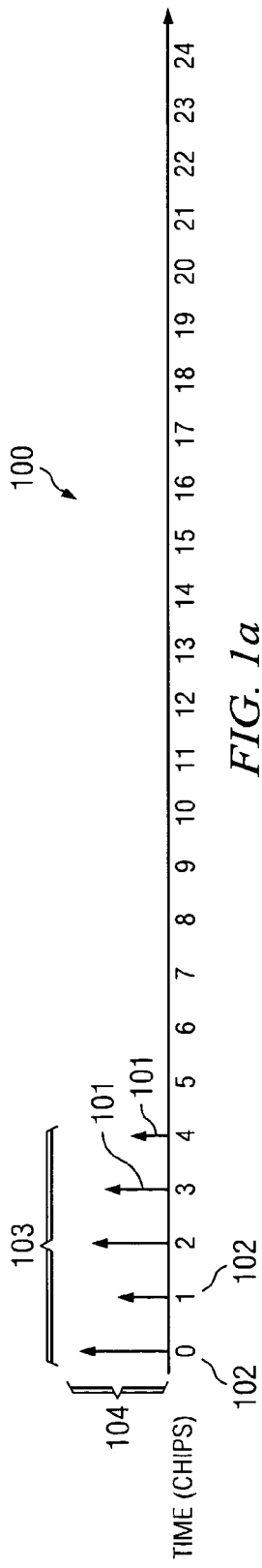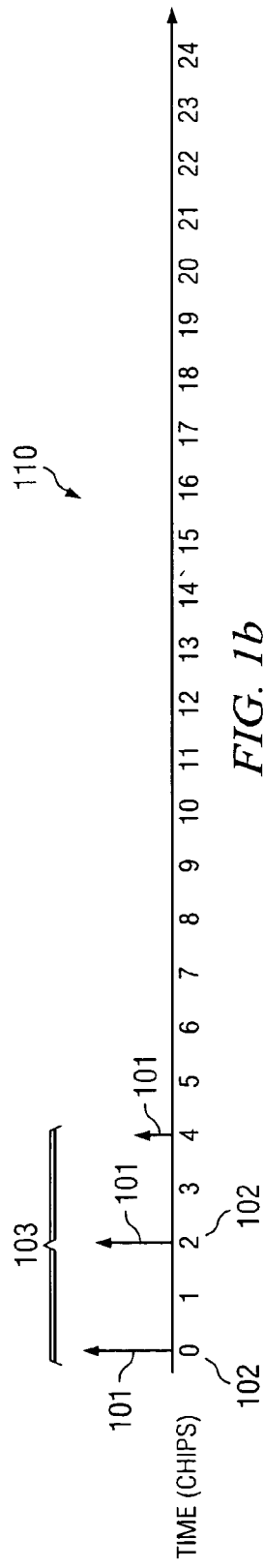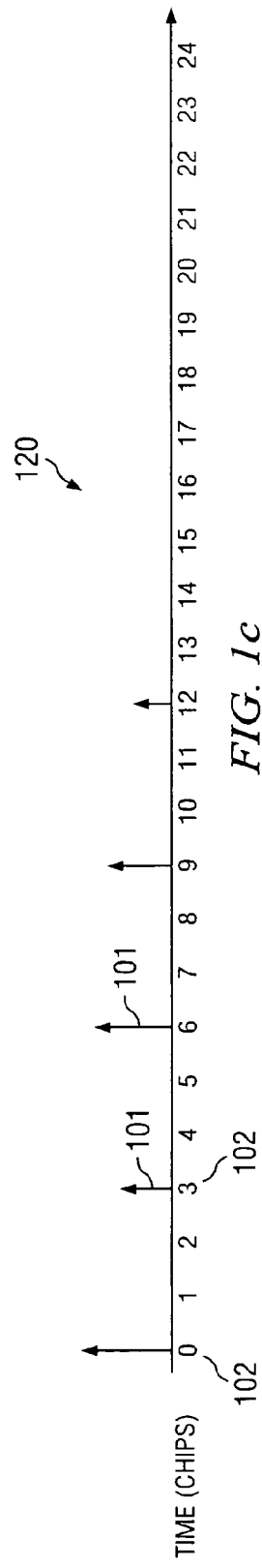

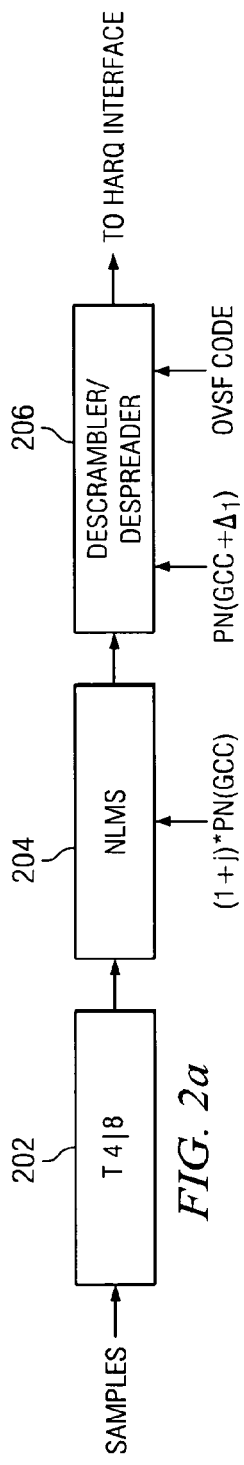
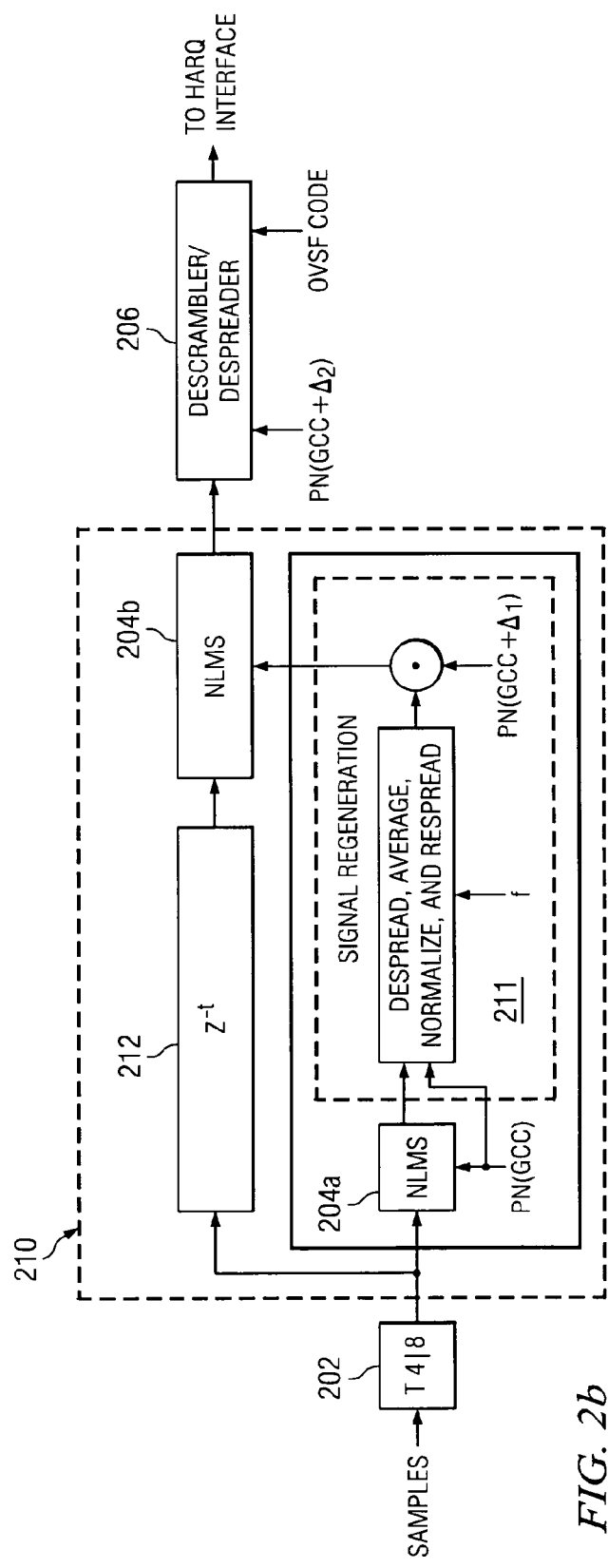

RECONFIGURABLE CHIP LEVEL EQUALIZER ARCHITECTURE

CROSS-REFERENCE TO RELATED APPLICATIONS

This application claims priority to U.S. Provisional Application No. 60/435,529 filed Dec. 20, 2002 and entitled "Chip Level Equalizer," incorporated herein by reference.

FIELD OF THE INVENTION

The present invention relates generally to wireless communication systems.

BACKGROUND

In general, wireless communication systems transmit signals between transmitting antennas and receiving antennas. Because the location of transmitting and receiving antennas may be far apart, a transmitted signal often encounters a variety of mediums en route to a receiving antenna. For example, a transmitted signal may encounter mountains, buildings, and other mediums en route to a receiving antenna. Additionally, many transmitting and receiving antennas are mobile, e.g., cell phone antennas. As a result, a transmitted signal is often divided into a plurality of sub-signals, with each sub-signal having a unique path and time delay, en route to a receiving antenna. The existence of multi-path propagation requires special consideration when designing a wireless communication system. For example, at the receiving antenna, the original transmitted signal may be reconstructed by adding the sub-signals together.

In an effort to increase the data rate capacity of wireless communication systems, higher order modulation schemes, e.g., 16 QAM (quadrature amplitude modulation) or 8-PSK (phase shift keying), and spectrally efficient data allocation schemes have been developed. For example, 1x evolution data and voice (1xEV-DV), phase shift keying (8-PSK), and high speed downlink packet access (HSDPA) are standards that permit higher data transmission rates through the use of higher order modulation schemes and/or spectrally efficient data allocation schemes.

Unfortunately, using higher order modulation schemes (e.g. 16 QAM, 8-PSK) and spectrally efficient data allocation schemes make wireless communication systems undesirably sensitive to multi-path data propagation. In particular, multi-path data propagation may cause a loss of signal orthogonality resulting in data on one channel being more susceptible to interference from other channels and, thereby significantly decreasing data throughput of the wireless communication system. Therefore, methods and systems that overcome performance degradation due to multi-path data propagation, while permitting high data transfer rates are desirable.

SUMMARY

Accordingly, there is disclosed herein a reconfigurable chip level equalizer having circuitry that restores signal orthogonality and eliminates channel interference for a wireless transmitted signal. In at least some embodiments, the reconfigurable chip level equalizer comprises two or more adaptive equalizers, a plurality of operational blocks that interconnect the two or more adaptive equalizers, and a control mechanism that configures the two or more adaptive equalizers and operational blocks according to different signal delay profiles. In response to at least one type of signal delay profile, the reconfigurable chip level equalizer may be configured to operate with only one equalizer.

BRIEF DESCRIPTION OF THE DRAWINGS

For a detailed description of various embodiments of the invention, reference will now be made to the accompanying drawings in which:

FIGS. 1a-1d show embodiments of multi-path signal delay profiles;

FIG. 2a shows a block diagram illustrating a receiving system that uses a single-stage chip level equalizer;

FIG. 2b shows a block diagram illustrating a receiving system that uses a two-stage chip level equalizer;

NOTATION AND NOMENCLATURE

Figure 1D:
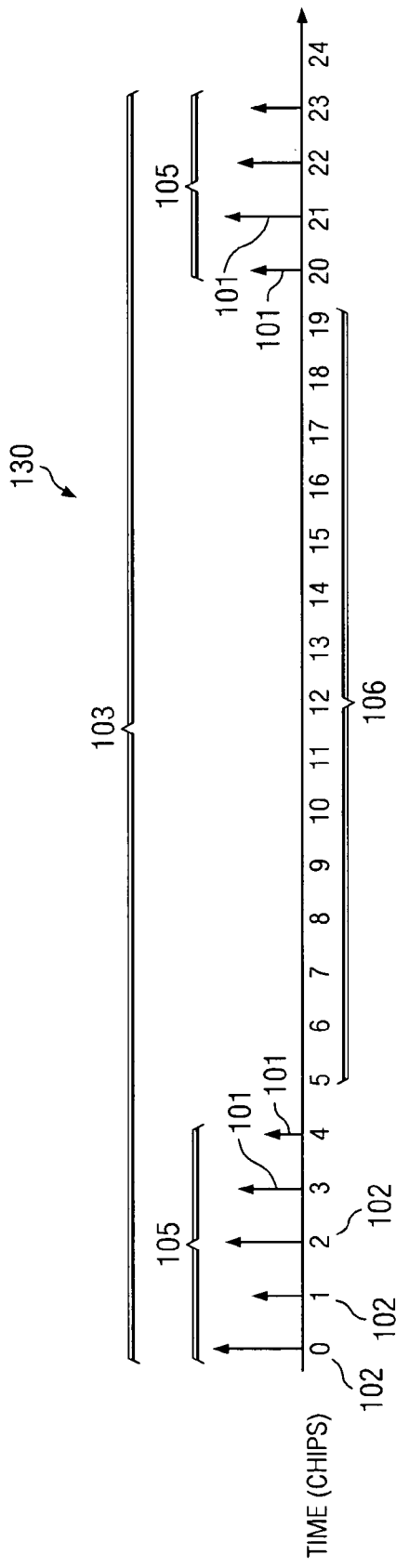

Certain terms are used throughout the following description and claims to refer to particular system components. As one skilled in the art will appreciate, companies may refer to a component by different names. This document does not intend to distinguish between components that differ in name but not function. In the following discussion and in the claims, the terms "including" and "comprising" are used in an open-ended fashion, and thus should be interpreted to mean "including, but not limited to . . . ". Also, the term "couple" or "couples" is intended to mean either an indirect or direct electrical connection. Thus, if a first device couples to a second device, that connection may be through a direct electrical connection, or through an indirect electrical connection via other devices and connections.

DETAILED DESCRIPTION

While the invention is susceptible to various modifications and alternative forms, specific embodiments thereof are shown by way of example in the drawings and will herein be described in detail. It should be understood, however, that the drawings and detailed description thereto are not intended to limit the invention to the particular form disclosed, but on the contrary, the intention is to cover all modifications, equivalents and alternatives falling within the spirit and scope of the present invention as defined by the appended claims.

Typically, a wireless communication system prepares a signal for transmission by modulating the signal. Modulation may comprise a variety of techniques, including frequency modulation, time modulation, and code modulation techniques, that permit a particular signal to be distinguished from other wireless signals. After the signal has been modulated, an antenna may transmit the signal to a receiving antenna.

As previously described, a transmitted signal may arrive to a receiving antenna as a plurality of sub-signals, or reflections. There are at least two techniques to overcome the effects of multi-path propagation in high bandwidth systems, such as HSPDA and 1xEV-DV, so that the original signal is restored with minimal distortion (caused by channel interference, etc). One approach is to restore the orthogonality of the transmitted signal using chip level equalization (CLE). CLE uses an adaptive equalizer to track the time varying amplitude and delay characteristics of a channel such that error in the received signal is reduced to a minimum. For more information regarding adaptive equalization, reference may be made to U.S. Pat. No. 6,587,504, entitled "Adaptive Equalizer and designing method thereof", which is herein incorporated by reference.

Another approach to overcome the effects of multi-path propagation in high-bandwidth systems may include employing an interference canceler to estimate, regenerate, and cancel interference from other channels. In considering possible embodiments, it is noted that the CLE may be simpler to implement and more cost effective due to its finite impulse response (FIR) filter structure, while the interference canceler may give better performance. As will be disclosed herein, a configurable chip-level equalizer may be used to provide equalization for a variety of multi-path profiles and decoding strategies.

FIG. 1a shows a time profile 100 of a multi-path signal 103. As shown in FIG. 1a, sub-signals 101 of a multi-path signal 103 may vary in amplitude 104 and time of arrival. In particular, FIG. 1a illustrates a multi-path delay profile 100 in which the sub-signals 101 arrive in consecutive chip-time units 102. For example, profile 100 may be representative of multi-path propagation due to a receiving antenna (e.g., a cell phone antenna) moving slowly (e.g., at speeds less than 10 km/hr).

In order for the CLE to restore orthogonality to a transmitted signal, a number of taps (i.e., computing unit time-spans) are required. The number of taps is computed as:

$$N = 2\delta_\tau + 1 \quad (1)$$

Where "N" is the number of taps and "$\delta_\tau$" is the total time interval during which sub-signals 101 with significant energy arrive. For the example of FIG. 1a, $\delta_\tau=4$ and the required number of taps N=9. FIG. 1b shows a time profile 110 of a multi-path signal 103 in which three sub-signals 101 arrive in non-consecutive chip-time units 102. For example, the profile 110 may be representative of multi-path propagation due to a receiving antenna moving relatively quickly (e.g., greater than 10 km/hr). It is noted that the required number of taps N is equal to 9 as in FIG. 1a since $\delta_\tau$ is again equal to 4. FIG. 1c illustrates a multi-path profile 120 in which the sub-signals 101 are spread out over a larger number of chip-time units 102. For example, profile 120 may be representative of multi-path propagation due to a receiving antenna is moving relatively quickly, e.g., greater than 10 km/hr. As shown in FIG. 1c, $\delta_\tau=12$ and the number of taps N=25. For the multi-path signal profile 120 of FIG. 1c, an equalizer with more than twice the number of taps as the equalizers of FIGS. 1a and 1b would be desirable. FIG. 1d illustrates a time profile 130 of a multi-path signal 103 wherein two clusters 105 of sub-signals 101 are separated by a number of chip-time units 102. For example, profile 130 may be representative of multi-path propagation due to a receiving antenna being used in hilly or mountainous terrain. In the example of FIG. 1d, two equalizers may be used and their responses combined in order to account for the delay 106 between the two clusters 105.

The profiles 100, 110, 120, and 130 of FIGS. 1a-1d illustrate a variety of possible multi-path delay profiles. Some embodiments of the invention comprise a configurable CLE that may use multiple modes to adjust dynamically to different multi-path delay profiles, such as those illustrated by FIGS. 1a-1d. As will be described below, a reconfigurable chip level equalizer (CLE) may use Normalized Least-Mean-Square (NLMS) adaptive algorithms to minimize any error to the transmitted signal caused by changes in a transmission channel. However, embodiments of the reconfigurable CLE are not limited to NLMS equalization and other adaptive algorithms (e.g. Least-Mean-Square (LMS), Griffith's, constrained-response minimum output energy (CRMOE), pre-filter rake, linear minimum squared error (LMMSE), and others) may be implemented in some embodiments instead of the NLMS algorithms.

FIG. 2a shows a block diagram illustrating a receiving system that uses a single-stage chip level equalizer 204. As shown in FIG. 2a, a single-stage chip level equalizer 204 may be coupled between a downsampler 202, and a descrambler/despreader block 206. Digitized samples of a received wireless signal are input to the downsampler 202, which may resample the input at a lower sampling rate, (e.g., resample every 4$^{th}$ or 8$^{th}$ input sample). In some embodiments, a downsampler 202 may not be necessary if the digital data samples are transferred at a rate compatible with the equalizer 204. The downsampler 202 outputs a downsampled version of the received signal to the NLMS equalizer 204. The equalizer 204 may adaptively filter the input using a finite impulse response (FIR) filter. An FIR filter may include one or more delay taps that determine the length of the filter, wherein each tap has an associated weight coefficient that correspond to an impulse response.

To accomplish the adaptive filtering, equalizer 204 may update the filter tap weights of the FIR filter so that channel induced error is sufficiently reduced. To update the filter tap weights, equalizer 204 preferably calculates a "norm" square by squaring the values stored at each FIR tap delay and adding them together. The norm square value is divided (i.e., normalized) by an adjustable adaptation coefficient and the result is multiplied by a signal error approximation which may be obtained by subtracting the FIR output from a desired signal. The result of the multiplication may be used to replace the previous filter tap weights of the FIR, thereby allowing the equalizer to adjust to changes in a transmission channel as previously described.

In at least some embodiments, the desired signal mentioned above may comprise a pilot signal provided by an HSDPA, or another, standard. As shown in FIG. 2a, a signal "(1+j)*PN(GCC)" may be input to the NLMS equalizer 204 as the pilot signal, where PN is a complex (i.e., having real components and imaginary "j" components) pseudo random number (PN) sequence whose starting point is determined by a global chip counter (GCC). As previously mentioned, the receiving system uses the single-stage equalizer 204 to track changes in a wireless communication channel and minimize interference, e.g. intersymbol intereference (ISI), caused by those changes. The GCC (not shown) enables synchronization between the equalizer 204 and other components, e.g., the descrambler/despreader block 206. In at least some embodiments, the signal-stage equalizer 204 may be used with multi-path delay profiles similar to that shown in FIG. 1a, wherein multi-path sub-signals arrive in consecutive chip-time units.

The output from the NLMS equalizer 204 may be input to the descrambler/despreader block 206. The descrambler/despreader block 206 preferably multiplies the input by the conjugate of the PN sequence "PN(GCC+$\Delta_1$)" to descramble the data. The data may then be despread using orthogonal variable spreading factor (OVSF) codes which are input to the descrambler/despreader block 206. A time delay "$\Delta_1$" may be added to the GCC timing for the descrambler/despreader block 206 to account for the delay of the NLMS equalizer 204.

FIG. 2b illustrates a receiving system that uses a two-stage chip level equalizer 210. As shown in FIG. 2b, a two-stage chip level equalizer 210 may be coupled between a downsampler 202, and a descrambler/despreader block 206. As shown, digitized samples of a received wireless signal are input to the downsampler 202, which resamples the input at a lower sampling rate, (e.g., resample every $4^{th}$ or $8^{th}$ input sample). The downsampler 202 outputs a signal to NLMS equalizer 204a and a delay line 212. Again, the NLMS equalizer filters the input using a FIR filter and updates the filter tap weights (weight coefficients) as described above.

The output of equalizer 204a is received by signal regeneration block 211, which despreads, averages, normalizes, respreads, and multiplies the equalizer 204a output by pilot signal "PN(GCC+$\Delta_1$)". Again, "$\Delta_1$" is a delay related to equalizer 204a that is added to the GCC to synchronize the timing between equalizer 204a and other components, e.g., signal regeneration block 211. The output of signal regeneration block 211 is used as the desired signal, or pilot signal, for NLMS equalizer 204b. It is noted that the delay provided by delay line 212 preferably synchronizes the operation of equalizer 204b with the operation of equalizer 204a and signal regeneration block 211. The NLMS adaptive equalizer 204b receives the delayed original signal from delay line 212, and performs FIR filtering and filter tap weight updating functions as previously described using the output of signal regeneration block 211 as a training signal (pilot signal).

Implementing the two-stage CLE 210 in a receiving system allows improved channel tracking accuracy and speed compared to the single-stage CLE 200. This is because equalizer 204b uses a "trained" pilot signal (i.e., the output of signal regeneration block 211 provides a more accurate training signal for equalizer 204b than would a standard PN sequence). The equalizers 204a and 204b of FIG. 2b may each have their own calculation resources (not shown), which are used for updating weight coefficients (filter tap weights) as previously described. In at least some embodiments, the two-stage CLE 210 may be used with multi-path time profiles similar to those shown in FIGS. 1a and 1b. In some embodiments the two-stage CLE 210 may be used as a "default" configuration.

As previously described for the signal-stage CLE 204, the output from the two-stage CLE 210 may be input to a descrambler/despreader block 206. The descrambler/despreader block 206 multiplies the input by the conjugate of the PN sequence "PN(GCC+$\Delta_2$)" to descramble the data. The data may then be despread using orthogonal variable spreading factor (OVSF) codes which are input to the descrambler/despreader block 206. Time delay "$\Delta_2$" may be added to the GCC timing for the descrambler/despreader block 206 to account for the delay of equalizer 204a, signal generation delay, delay line 212, and/or equalizer 204b.

Figure 2C:
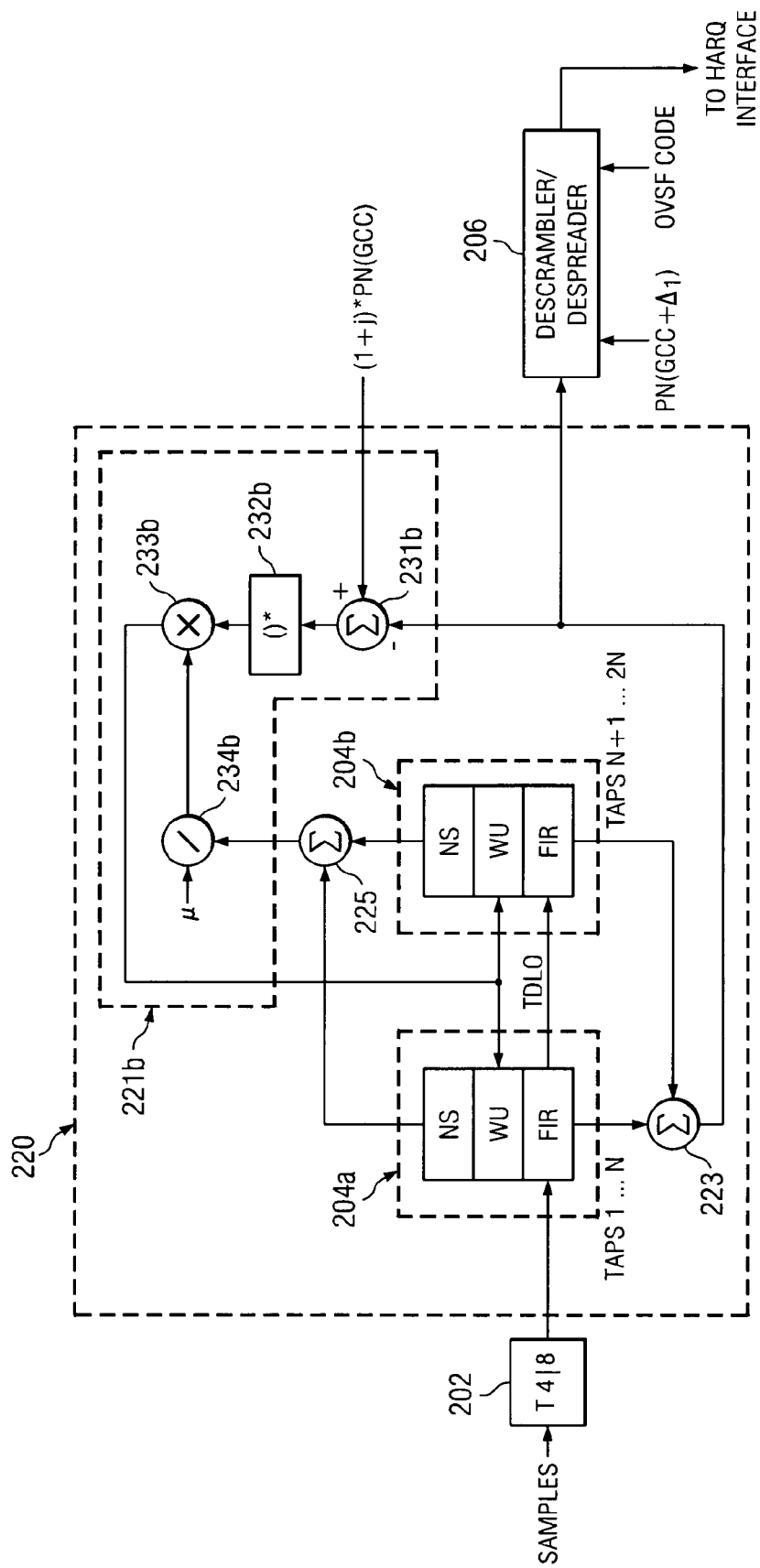
FIG. 2c shows a block diagram illustrating a receiving system that uses a chip level equalizer embodiment with multiple adaptive equalizers to expand a tap delay line of a filter operation.

FIG. 2c shows a block diagram illustrating a receiving system that uses an embodiment of a "concatenated" CLE 220 having multiple adaptive equalizers. As shown in FIG. 2c, two partial NLMS equalizers 204a and 204b may be placed in series, thereby effectively extending the tap delay line. In at least some embodiments, the concatenated CLE 220 may be used with multi-path time profiles similar to that shown in FIG. 1c, wherein the multi-path sub-signals are spread over a large number of chip-time units.

As shown in FIG. 2c, the concatenated CLE 220 may be coupled to a downsampler 202, wherein digitized samples of a received wireless signal are input to the downsampler 202, which resamples the input at a lower sampling rate, (e.g., resample every $4^{th}$ or $8^{th}$ input sample). The downsampler 202 outputs a signal to adaptive equalizer 204a, which performs FIR filtering, norm square computation, and weight update functions as previously described.

As shown in FIG. 2c, the calculation resources 221b of adaptive equalizer 204b are used by both equalizers 204a and 204b to update the filter tap weights. The calculation resources 221b, as shown, generally requires that NLMS equalizers 204a and 204b be modified from a "standard" equalizer configuration in which an equalizer uses its own calculation resources (e.g., the NLMS equalizers shown in FIGS. 2a and 2b would each use their own calculation resources). In the embodiment of FIG. 2c, sharing calculation resources 221b would conserve more power than other embodiments, which may implement the calculation resources of equalizers 204a and 204b.

As shown, the concatenated CLE 220 combines the norm squares of equalizers 204a and 204b using a summer 225 and provides the norm square sum to calculation resource 221b (the calculation resource of equalizer 204b) which performs the steps of comparing the FIR output to a desired pilot signal "(1+j)*PN(GCC)", normalizing the norm square sum, and updating the weights coefficients for both equalizers 204a and 204b. As previously mentioned, using one calculation resource 221b for both equalizers 204a and 204b allows the calculation resource of the other equalizer to be temporarily disabled, thereby saving power.

In at least some embodiments, the calculation resource 221b may comprise a divider 234b, a multiplier 233b, a conjugate block 232b, and a subtracter 231b. As shown in FIG. 2c, the divider 234b divides the norm square sum by an adaptation coefficient "μ". The multiplier 233b multiples the output of the divider 234b by the conjugated difference (obtained by subtracting) between the pilot signal and the combined FIR outputs of equalizers 204a and 204b. As shown in FIG. 2c, summer 223 combines the FIR outputs of equalizers 204a and 204b, whereby subtracter 231b subtracts the summed FIR outputs from pilot signal "(1+j)*PN(GCC)". The subtraction result is conjugated by conjugate block 232b, which provides that conjugated signal to multiplier 233b as described above.

As shown in FIG. 2c, equalizer 204a may provide delay taps 1 to N of an FIR filter with tap length 2N and equalizer 204b may provide delay taps N+1 to 2N of the 2N tap FIR filter used for the concatenated CLE 220. As previously explained, the concatenated CLE 220 may preferably be used when a multi-path time profile is similar to that shown in FIG. 1c, wherein the multi-path sub-signals are spread out over many chip-time units. The output of concatenated CLE 220 may be descrambled and despread by descrambler/despreader block 206 as previously described.

Figure 2D:
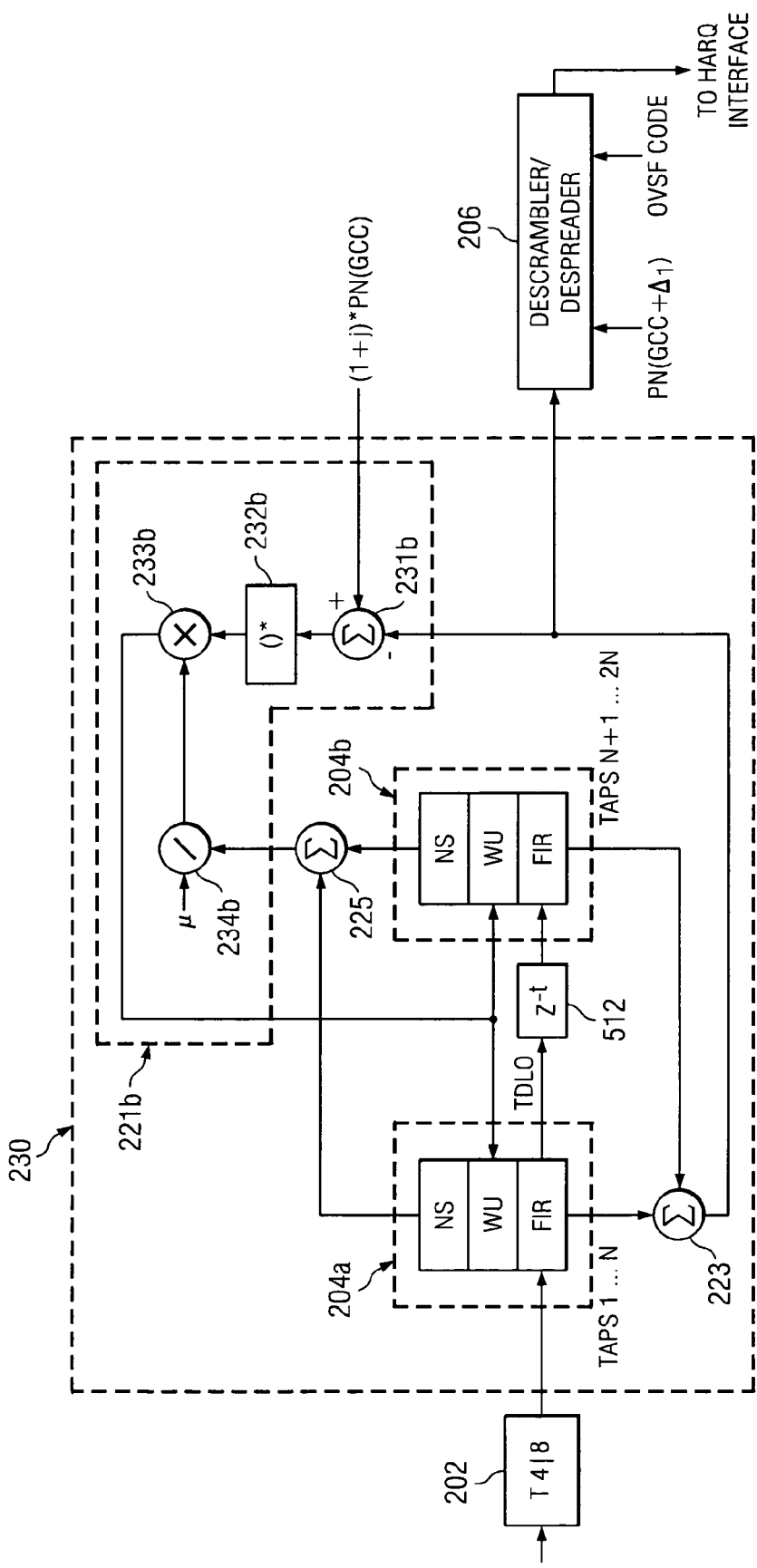
FIG. 2d shows a block diagram illustrating a receiving system that uses a chip level equalizer embodiment with multiple adaptive equalizers that can be used to filter two or more separate energy clusters.

FIG. 2d shows a block diagram illustrating a receiving system that uses an embodiment of a "sparse" CLE 230 that uses multiple adaptive equalizers. As shown in FIG. 2d, two NLMS equalizers 204a and 204b may be placed in series, separated by a delay line 512 that allows equalization of two clusters separated in time. In a preferred embodiment, the sparse CLE 230 may be used with multi-path time profiles similar to that shown in FIG. 1d, wherein two clusters of multi-path sub-signals are separated by a large number of chip-time units.

As shown in FIG. 2d, the sparse CLE 230 may be coupled to a downsampler 202, which resamples the input at a lower sampling rate, (e.g., resample every $4^{th}$ or $8^{th}$ input sample). The downsampler 202 outputs a downsampled received signal to adaptive equalizer 204a, which performs FIR filtering, norm square computation, and weight coefficient update functions as previously described.

The operation of the sparse CLE 230 is generally identical to the operation of the concatenated CLE 220, with the exception that a delay line 512 is placed between a tap delay output of equalizer 204a and a FIR filter input of equalizer 204b. By placing delay line 512 between the tap delay output of equalizer 204a and the FIR input of equalizer 204b, the sparse CLE 230 may be used to handle multi-path profiles in which a large delay separates clusters of multi-path sub-signals as was described for FIG. 1d. As shown in FIG. 2d, equalizer 204a may handle taps 1 to N and equalizer 204b may handle taps N+1 to 2N for the sparse CLE 230. As previously explained for other CLE embodiments, the output of sparse CLE 230 may be descrambled and despread using a descrambler/despreader block 206.

Figure 3:
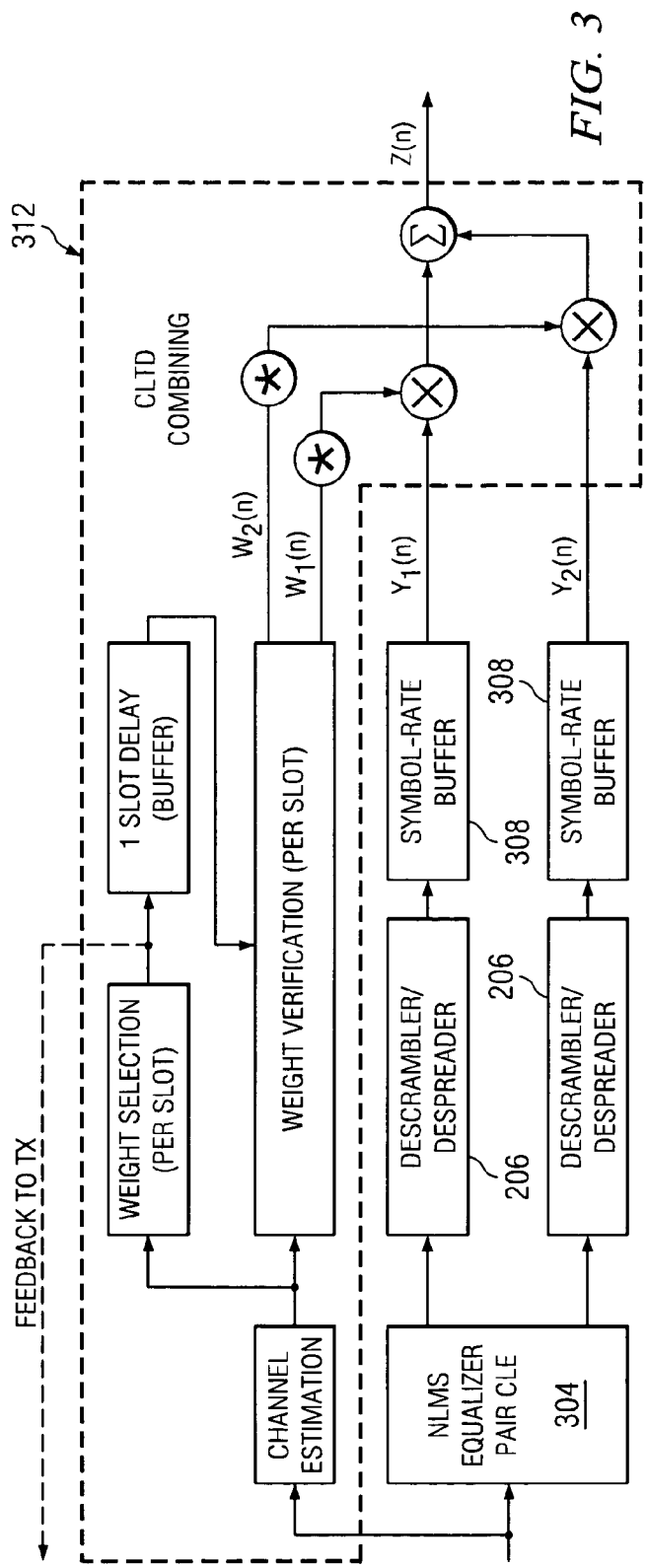
FIG. 3 shows a block diagram illustrating an embodiment of a closed-loop transmit diversity (CLTD) equalizer.

FIG. 3 is a block diagram illustrating a receiving system that uses closed-loop transmit diversity (CLTD) equalization. As shown in FIG. 3, the receiving system may comprise a single-stage equalizer pair 304, descrambler/despreader blocks 206, symbol-rate buffers 308, and CLTD decode block 312. The single-stage equalizer pair CLE 304 may receive a downsampled input signal as previously described for other receiving systems. The single-stage equalizer pair 304 may operate as two separate NLMS equalizers (e.g., equalizer 204 of FIG. 2a) preferably to support wireless systems that use multiple antennas for transmitting. The received signal is input also to CLTD decode block 312, which functions according to CLTD standards. The outputs of the NLMS equalizer pair 304 may be descrambled and despread by descrambler/despreader blocks 206 and forwarded to symbol-rate buffers 308 which synchronize the combination of the descrambled/despread equalizer outputs Y.sub.1(n) and Y.sub.2(n) with the calculation of CLTD weight estimates W.sub.1(n) and W.sub.2(n). In particular, the receiving system may be used when multiple antennas are used to transmit a wireless signal.

Figure 4:
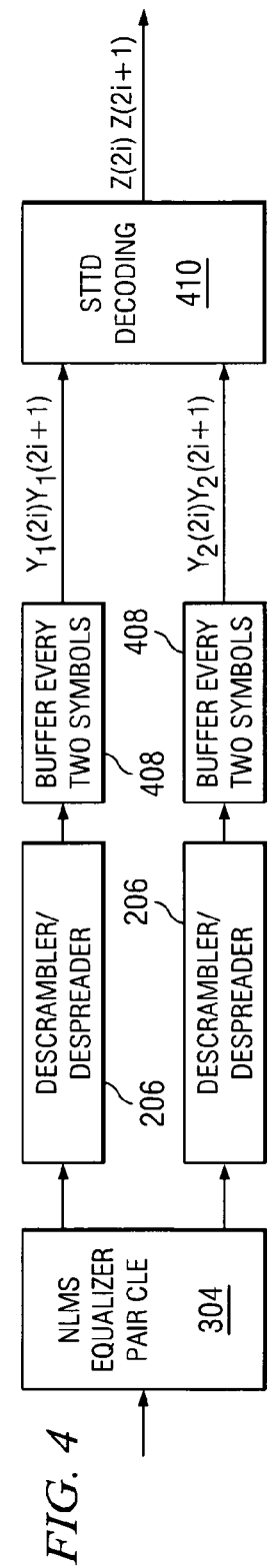
FIG. 4 shows a block diagram illustrating an embodiment of a space-time transmit diversity (STTD) equalizer.

FIG. 4 shows a block diagram illustrating a receiving system that uses space-time transmit diversity (STTD) equalization. As shown in FIG. 4, the system may comprise a single-stage equalizer pair CLE 304, decrambler/despreader blocks 206, buffer blocks 408, and STTD decoding block 410. The single-stage equalizer pair CLE 304 (e.g. two NLMS equalizers) receives a downsampled input signal as previously described for other receiving systems. The output of the equalizer pair block 304 may be descrambled and despread using the descrambler/despreader blocks 406, buffered every two symbols using buffer blocks 408, and decoded according to the STTD standard using STTD decoding block 410. In particular, the receiving system may be used when multiple antennas are used to transmit a wireless signal.

In accordance with embodiments of the present invention, a reconfigurable chip level equalizer may perform the functions of the equalizers of FIGS. 2a-2d, FIG. 3, and FIG. 4. In at least some embodiments, a reconfigurable chip level equalizer may comprise two or more adaptive equalizers, a plurality of operational blocks that interconnect the two or more adaptive equalizers, and a control mechanism that configures the two or more adaptive equalizers and operational blocks according to the different signal delay profiles. In response to at least one signal delay profile, the reconfigurable chip level equalizer may be configured to operate using only one equalizer.

Figure 5:
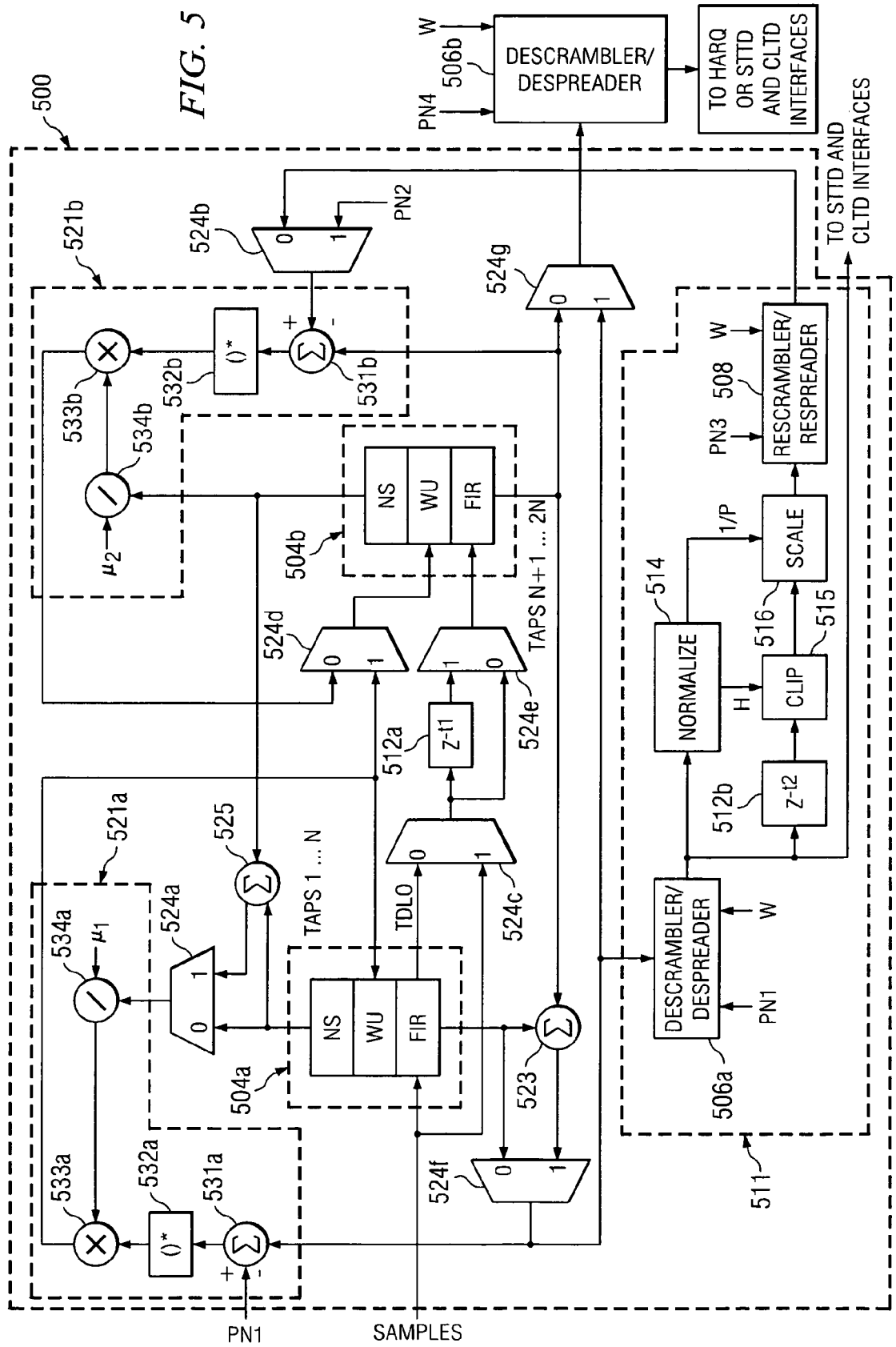
FIG. 5 shows a block diagram illustrating a reconfigurable chip level equalizer in accordance with embodiments of the invention.

FIG. 5 is a block diagram illustrating a reconfigurable chip level equalizer 500 in accordance with embodiments of the present invention. As shown in FIG. 5, the reconfigurable CLE 500 may comprise adaptive equalizer blocks 504a and 504b coupled to each other and to computational resources 521a and 521b through multiplexers 524a-524f. The computational blocks 521a and 521b may comprise subtract blocks 531a and 531b, conjugate blocks 532a and 532b, multiplication blocks 533a and 533b, and division blocks 534a and 534b. The reconfigurable CLE 500 may also comprise a plurality of operational blocks, such as a signal regeneration block 511, coupled to one of the adaptive equalizer blocks 504. As shown in FIG. 5, the signal regeneration block 511 may comprise a descrambler/despreader block 506a, a delay line 512b, a normalization block 514, a clipping block 515, a scaling block 516, and a rescrambler/respreader block 508. As shown, the reconfigurable CLE 500 may also comprise a delay line 512a coupled between equalizers 504a and 504b through multiplexers 524c and 524e.

As shown in FIG. 5, a number of pilot signals (PN1-PN4) may be used as pseudo number sequences. The pilot signals may be used by various components of the reconfigurable CLE 500. Specifically, in some embodiments, summer 531a and descrambler/despreader 506a may receive a pilot signal PN1, multiplexer 524b may receive a pilot signal PN2, rescrambler/respreader 508 may receive a pilot signal PN3, and descrambler/despreader 506b may receive a pilot signal PN4. In some embodiments, PN3 and PN4 may be time-shifted versions of PN1.

In at least some embodiments, the multiplexers 524a-524g allow the reconfigurable chip level equalizer 500 to operate in a plurality of modes corresponding to characteristics (attributes) of a received signal delay profile and/or transmission modes. More specifically, controlling multiplexers 524a-524g allow the reconfigurable CLE 500 to be used as a single-stage CLE 200 (FIG. 2a), a two-stage CLE 210 (FIG. 2b), a concatenated CLE 220 (FIG. 2c), a sparse CLE 230 (FIG. 2d), and single-stage equalizer pair CLE 304 (FIGS. 3 and 4). In at least some embodiments, the reconfigurable CLE 500 may function according to Table 1 as shown below.

TABLE 1

|  | Mux0 (524a) | Mux1 (524b) | Mux2 (524c) | Mux3 (524d) | Mux4 (524e) | Mux5 (524f) | Mux6 (524g) |
| --- | --- | --- | --- | --- | --- | --- | --- |
| Single-Stage CLE | 0 | X | X | X | X | 0 | 1 |
| Two-Stage CLE | 0 | 0 | 1 | 0 | 1 | 0 | 0 |
| Concatenated CLE | 1 | X | 0 | 1 | 0 | 1 | 1 |
| Sparse CLE | 1 | X | 0 | 1 | 1 | 1 | 1 |
| 2 Single-Stage | 0 | 1 | 1 | 0 | 0 | 0 | 0 |

TABLE 1-continued

| | Mux0 (524a) | Mux1 (524b) | Mux2 (524c) | Mux3 (524d) | Mux4 (524e) | Mux5 (524f) | Mux6 (524g) |
|---|---|---|---|---|---|---|---|
| CLE's | | | | | | | |

As shown in Table 1, the reconfigurable CLE 500 functions as a single-stage CLE 200 when multiplexer (mux) 524a is set to input 0, mux 524b is irrelevant ("X"), mux 524c is irrelevant, mux 524d is irrelevant, mux 524e is irrelevant, mux 524f is set to input 0, and mux 524g is set to input 1. Similarly, other operating modes may be activated by setting multiplexers 524a-524g to their corresponding settings (i.e., input 0, input 1, or irrelevant) as shown, for example, in Table 1.

In order to select the most appropriate equalization mode of reconfigurable CLE 500, several parameters may be considered, such as, the delay time spread of the channel, the received power, the number of antennas, the target power consumption, and the maximum separation between multipath clusters. In a preferred embodiment, the reconfigurable CLE 500 may automatically change modes in response to changes in the above mentioned parameters or other related parameters.

Figure 6A:
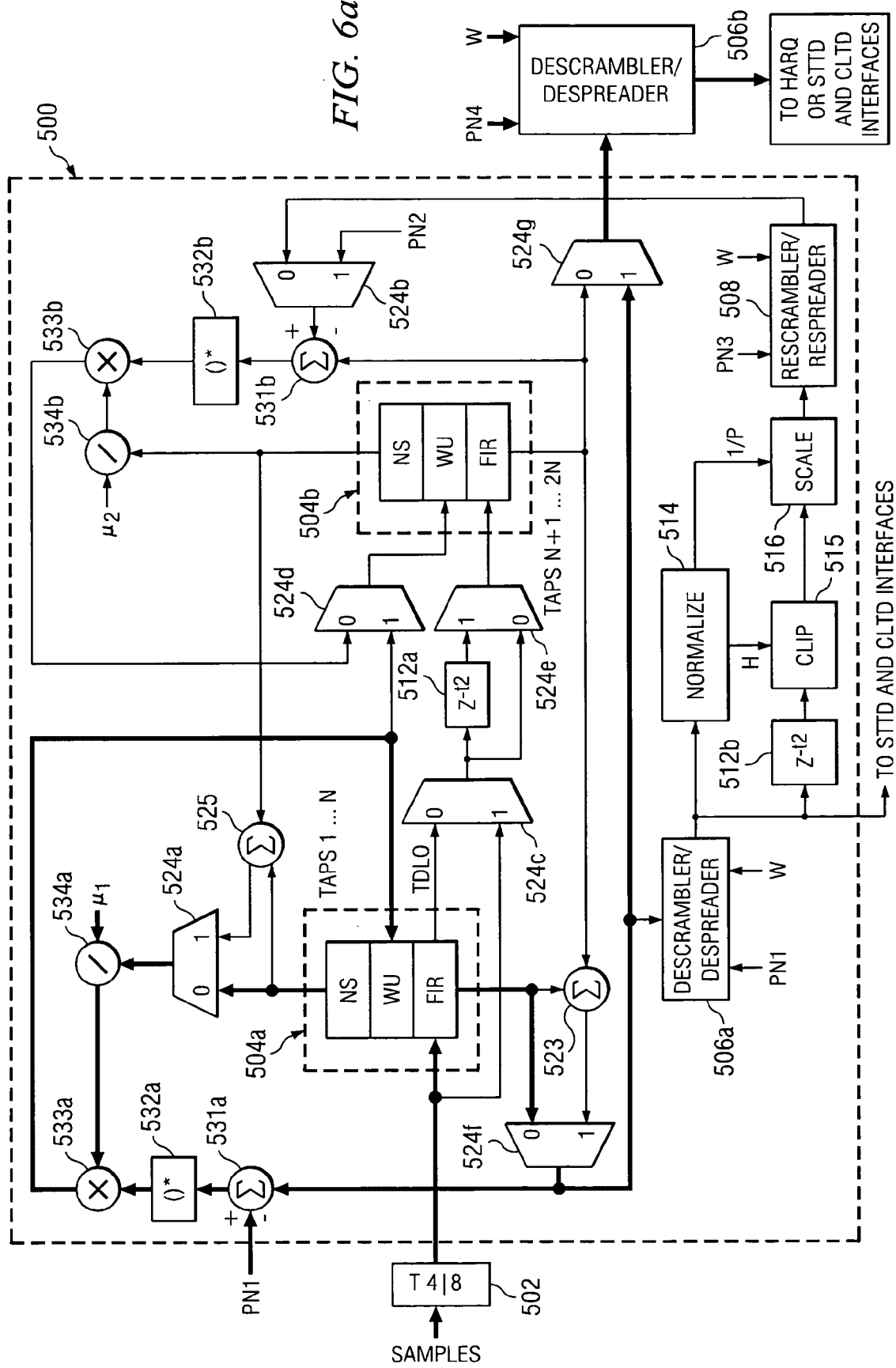
FIGS. 6a-6e show operating modes of the reconfigurable chip level equalizer illustrated in FIG. 5 in accordance with embodiments of the invention.

FIG. 6a is a block diagram illustrating an embodiment of the reconfigurable CLE 500 of FIG. 5 in a single-stage configuration. As shown, bold line portions of the reconfigurable CLE 500 are preferably enabled during the single-stage configuration. In the embodiment of FIG. 6a, the reconfigurable CLE 500 functions as a single-stage CLE (e.g. CLE 200 of FIG. 2a). As was previously described for CLE embodiments, the reconfigurable CLE 500 may be coupled between a downsampler 502, and a descrambler/despreader block 506b.

As shown, digitized samples of a received wireless signal are input to the downsampler 502, which resamples the input at a lower sampling rate, (e.g., resample every $4^{th}$ or $8^{th}$ input sample). The downsampler 502 outputs a signal to the NLMS equalizer 504a, which calculates a norm square (NS block) by squaring the values stored at each tap delay and adding them together. The output of equalizer 504a is obtained using a FIR (Finite Impulse Response) filtering operation (FIR block), passed through mux 524f (set to input 0), and compared with a desired signal "PN1" using subtracter 531a. The output of subtracter 531a is conjugated by conjugate block 532a and input to multiplication block 533a. The multiplication block 533a also receives as input the result of dividing the norm square by an adaptation coefficient "$\mu_1$" (i.e., the norm square value is normalized using $\mu_1$), which is carried out by the divider block 534a. As shown, the norm square value is passed to divider 534a through mux 524a (set to input 0). The multiplication block 533a multiplies the normalized norm square by the conjugated difference between the equalizer 504a output and the desired (pilot) signal "PN1", whereby weight coefficients (filter tap weights) are updated (WU block). The FIR output of equalizer 504a is forwarded to descrambler/despreader 506b through mux 524g (set to input 1). As previously explained for single-stage CLE 200, the embodiment of reconfigurable CLE 500 shown in FIG. 6a may preferably be used with multi-path time profiles similar to that shown in FIG. 1a, wherein multi-path sub-signals arrive in consecutive chip-time units. Alternatively, the embodiment of the reconfigurable CLE 500 shown in FIG. 6a also may be used when a substantial amount of the energy of the signal profile is contained within one sub-signal.

Figure 6B:
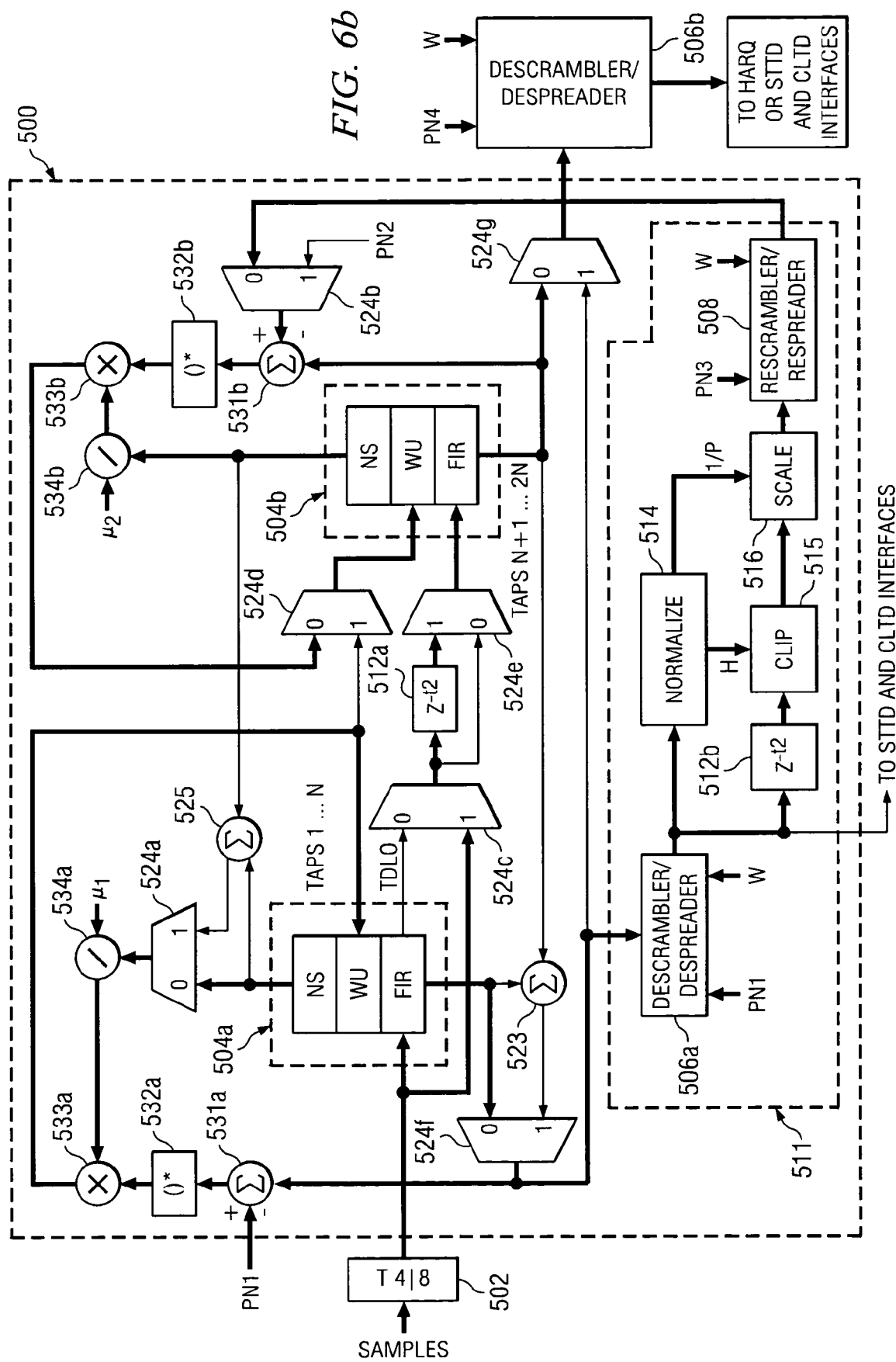

FIG. 6b is a block diagram illustrating an embodiment of the reconfigurable CLE 500 of FIG. 5 in a two-stage configuration. As shown, bold line portions of the reconfigurable CLE 500 are preferably enabled in the two-stage configuration. In the embodiment of FIG. 6b, the reconfigurable CLE 500 functions as a two-stage CLE (e.g. CLE 210 of FIG. 2b). As was previously described, the reconfigurable CLE 500 may be coupled between a downsampler 502, and a descrambler/despreader block 506b.

As shown, digitized samples of a received wireless signal may be input to the downsampler 502, which resamples the input at a lower sampling rate, (e.g., resample every $4^{th}$ or $8^{th}$ input sample). The downsampler 502 outputs a signal to equalizer 504a and to delay line 512a. As shown, delay line 512a receives the downsampler output through mux 524c (set to input 1). Equalizer 504a outputs a FIR filtered signal which is sent through mux 524f (set to input 0), whereby the received signal is compared with a pilot signal "PN1" by subtracter 531a. The result of subtracter 531a is conjugated by conjugate block 532a and input to multiplication block 533a. The multiplication block 533a also receives as input the result of dividing the norm square by the adaptation coefficient "$\mu_1$" (i.e., the norm square value is normalized using $\mu_1$), which is carried out by divider block 534a. As shown, the norm square value is passed directly to divider 534a through mux 524a (set to input 0). The multiplication block 533a multiplies the normalized norm square by the conjugated difference between the equalizer 504a output and the desired (pilot) signal "PN1", whereby weight coefficients (filter tap weights) are updated and stored in the weight update (WU) block of equalizer 504a.

The output of the equalizer 504a is forwarded to signal regeneration block 511, which may comprise a descrambler/despreader 506a, a normalize block 514, a delay line 512b, a clipping block 515, a scaling block 516, and a rescrambler/respreader block 508. The signal regeneration block 511 despreads, averages, normalizes, and respreads the output of equalizer 504a. The output of signal regeneration block 511 is then input to subtracter block 531b through mux 524b (set to input 0). The subtracter block 531b calculates the difference between the regenerated signal from regeneration block 511 and the FIR output of equalizer 504b. This difference is conjugated by conjugator 532b and input to multiplication block 533b. The multiplication block 533b also receives the normalized norm square of the input to equalizer 504b, which is divided (normalized) by adaptation coefficient "$\mu_2$" using divider 534b. As shown in FIG. 6b, equalizer 504b may receive the original input signal from downsampler 502 through mux 524c (set to input 1), delay line 512a, and mux 524e (set to input 1). The output of multiplication block 533b is used to update the weight coefficients (filter tap weights) of equalizer 504b (stored in the weight update "WU" block).

As previously explained, using the reconfigurable CLE 500 as a two-stage CLE (e.g. CLE 210) may allow tracking changes in a wireless channel more quickly and accurately than would be possible with a single-stage CLE (e.g., CLE 200). As shown, the equalizers 504a and 504b of FIG. 6b may each have their own calculation resources (e.g., divider, subtracter, conjugator, multiplier), which are used update the weight coefficients as previously described. As was previously mentioned for the two-stage CLE 210, the embodiment of reconfigurable CLE 500 shown in FIG. 6b may preferably be used with multi-path time profiles similar to those shown in FIGS. 1a and 1b.

Figure 6C:
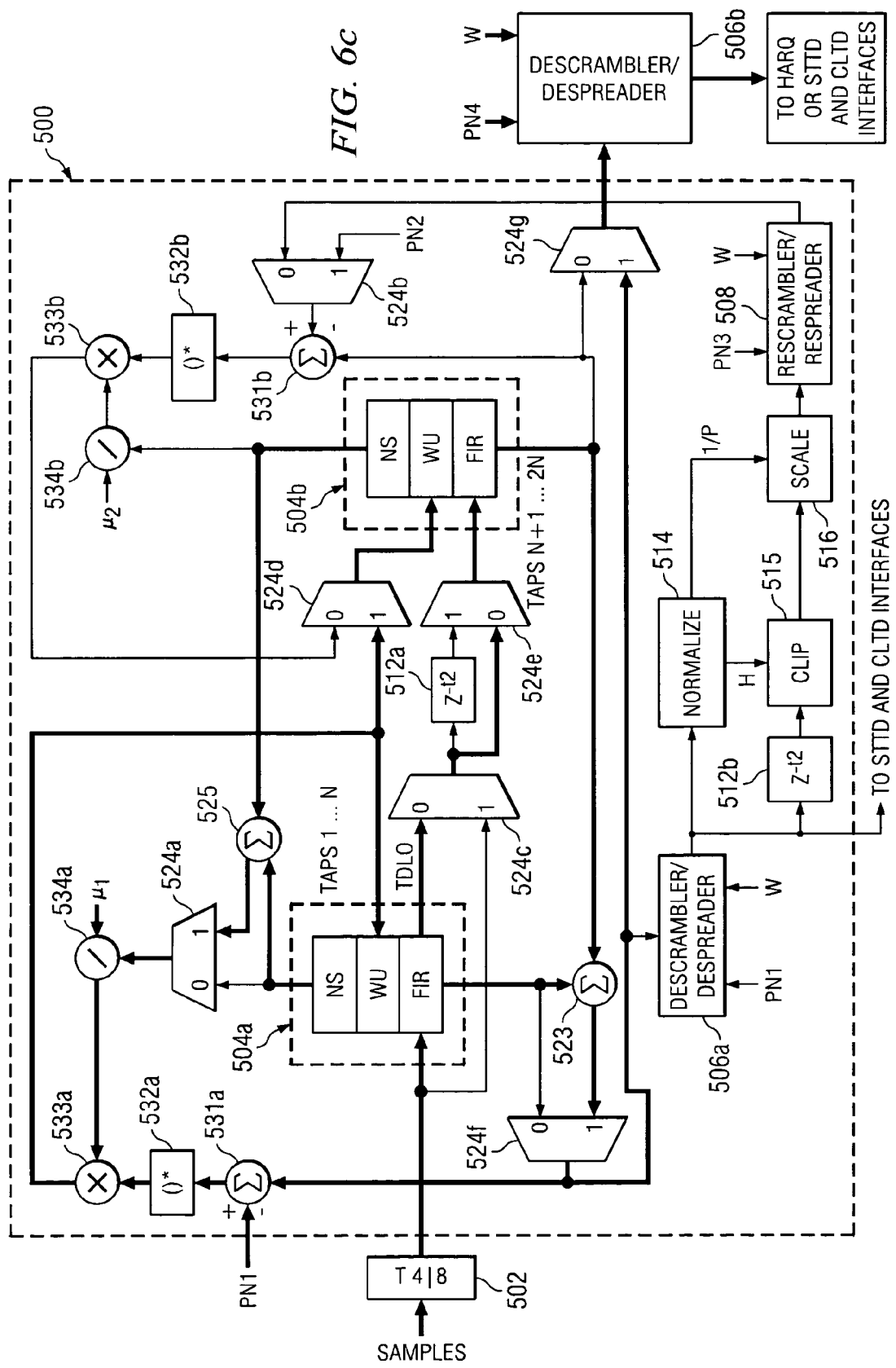

FIG. 6c is a block diagram illustrating an embodiment of the reconfigurable CLE 500 of FIG. 5 in a "concatenated" configuration. As shown, bold line portions of the reconfigurable CLE 500 are preferably enabled in the concatenated configuration. In the embodiment of FIG. 6c, the reconfigurable CLE 500 functions as a concatenated CLE (e.g. CLE 220 of FIG. 2c). As was previously described for CLE embodiments, the reconfigurable CLE 500 may be coupled between a downsampler 502, and a descrambler/despreader block 506b.

As shown, digitized samples of a received wireless signal are input to the downsampler 502, which resamples the input at a lower sampling rate, (e.g., resample every $4^{th}$ or $8^{th}$ input sample). The downsampler 502 outputs a signal to the NLMS equalizer 504a, which calculates a norm square (NS block) by squaring the values stored at each tap delay and adding them together. The tap delay line output ("TDLO") of equalizer 504a may be passed to equalizer 504b through mux 524c (set to input 0) and mux 524e (set to input 0).

The norm squares of equalizers 504a and 504b are summed by summation block 525 to create a combined norm square. The combined norm square is input to divider 534a through mux 524a (set to input 1), which divides the combined norm square by adaptation coefficient "$\mu_1$" (i.e., the combined norm square is normalized by $\mu_1$), and outputs a result to multiplication block 533a. Meanwhile, the FIR outputs of equalizers 504a and 504b are summed by summation block 523 and compared to a pilot signal "PN1" using subtracter 531a. As shown, the summed equalizer FIR outputs are forwarded to subtracter 531a through mux 524f (set to input 1). The output of subtracter 531a is conjugated by conjugate block 532a and input to multiplier 533a. The multiplication block multiplies the normalized combined norm square described above by the conjugated difference between the pilot signal and the summed equalizer outputs described above. The output of multiplication block 533a may then be used to update weight coefficients (filter tap weights) stored in the WU (weight update) blocks of equalizers 504a and 504b. As shown, the output of multiplier 533a is coupled to the WU block of equalizer 504b through mux 524d (set to input 1).

The combined FIR outputs of equalizers 504a and 504b are forwarded to descrambler/despreader block 506b through mux 524g (set to input 1). As previously explained for concatenated CLE 220, the embodiment of reconfigurable CLE 500 shown in FIG. 6c may preferably be used with multi-path time profiles similar to that shown in FIG. 1c, wherein multi-path sub-signals are spread out over a large number of chip-time units.

Figure 6D:
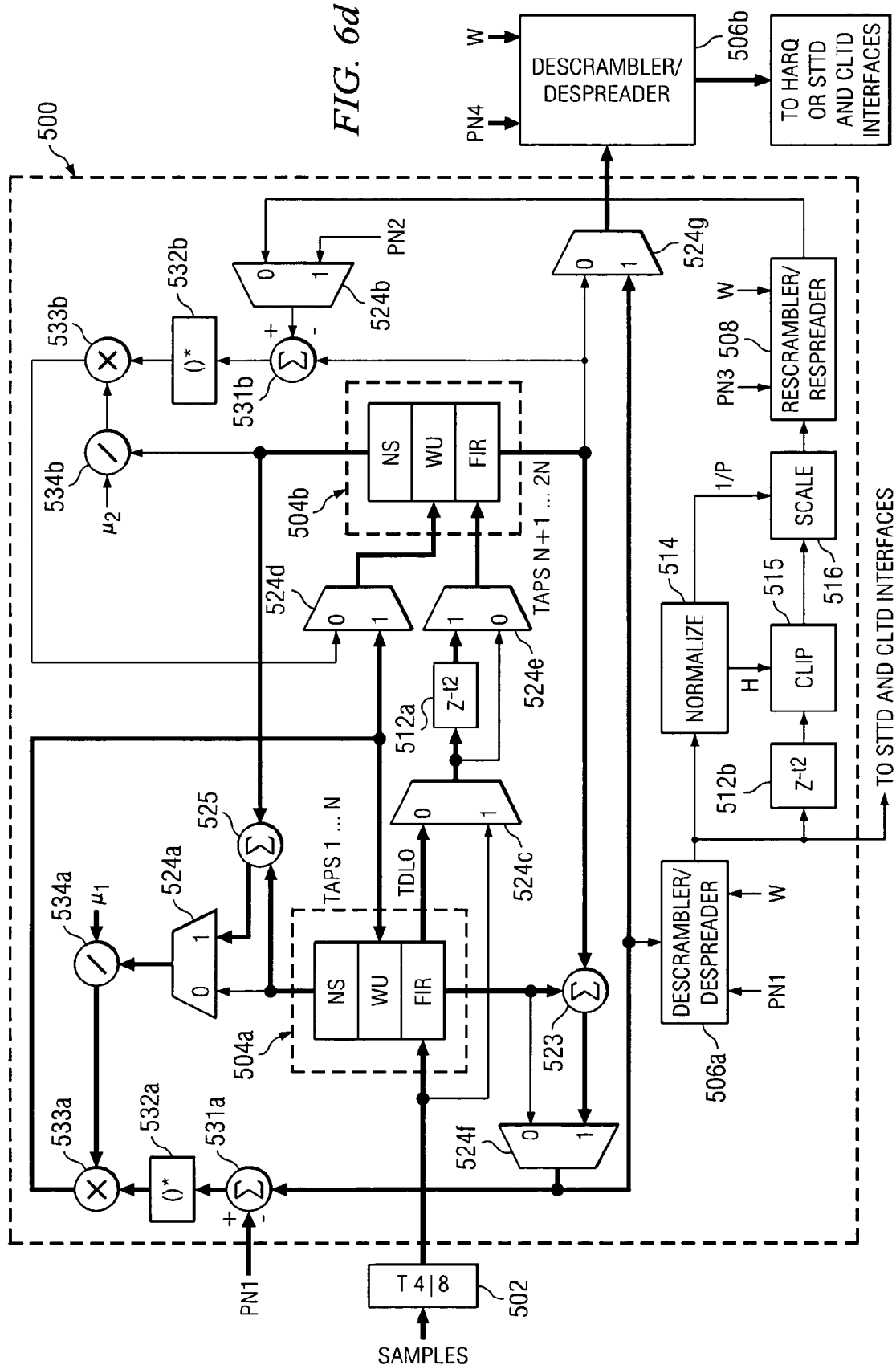

FIG. 6d is a block diagram illustrating an embodiment of the reconfigurable CLE 500 of FIG. 5 in a "sparse" configuration. As shown, bold line portions of the reconfigurable CLE 500 are preferably enabled in the sparse configuration. In the embodiment of FIG. 6d, the reconfigurable CLE 500 functions as a sparse CLE (e.g. CLE 230 of FIG. 2d). As was previously described for CLE embodiments, the reconfigurable CLE 500 may be coupled between a downsampler 502, and a descrambler/despreader block 506b.

As shown, the reconfigurable CLE embodiment of FIG. 6d is the same as the reconfigurable CLE embodiment of FIG. 6c with the exception that delay line 512a is used in FIG. 6d. As shown, delay line 512a is activated by setting mux 524e to input 1 instead of input 0 as was the case in the concatenated embodiment of FIG. 5c. As a result, the "sparse" configuration functions the same as the "concatenated" configuration explained above, except that a delay (using delay line 512a) may be added between the TDLO output of equalizer 504a and the FIR input of equalizer 504b. As previously explained the sparse configuration may preferably be used with multi-path time profiles in which clusters of multi-path sub-signals are separated by a large number of chip-time units.

Figure 6E:
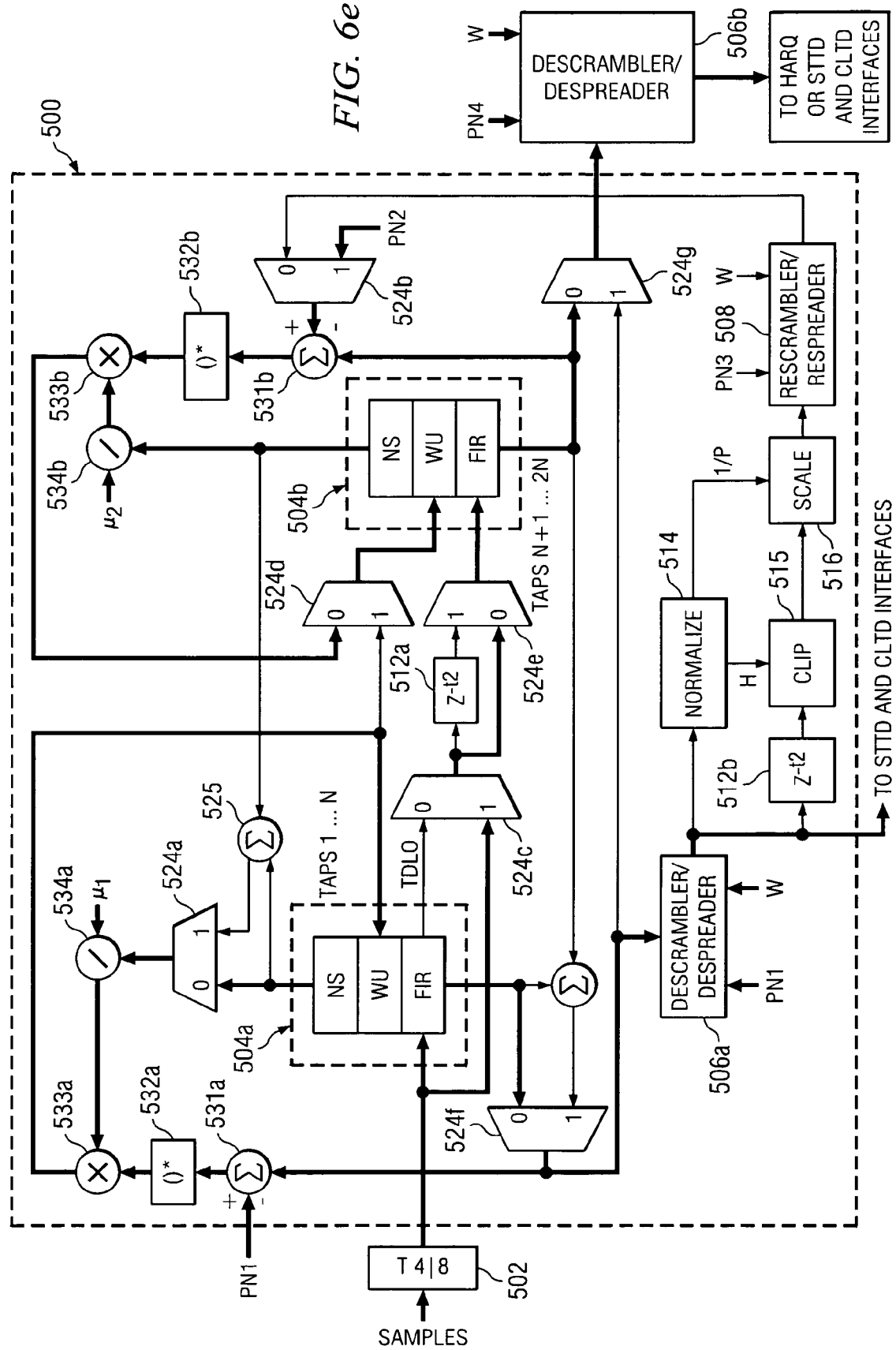

FIG. 6e is a block diagram illustrating an embodiment of the reconfigurable CLE 500 of FIG. 5 in a single-stage equalizer pair configuration (also called transmit diversity configuration). As shown, bold line portions of reconfigurable CLE 500 are preferably enabled during the transmit diversity configuration. In the embodiment of FIG. 6e, the reconfigurable CLE 500 functions as two single-stage CLE's, (i.e. two single-stage CLE's 200 as shown in FIG. 2a). As was previously described for CLE embodiments, the reconfigurable CLE 500 may be coupled between a downsampler 502, and a descrambler/despreader block 506b.

As shown, digitized samples of a received wireless signal are input to the downsampler 502, which resamples the input at a lower sampling rate, (e.g., resample every $4^{th}$ or $8^{th}$ input sample). The downsampler 502 outputs a signal to equalizers 504a and 504b, which each calculate a norm square (NS block) as previously described. As shown, equalizer 504b receives the output of downsampler 502 through mux 524c (set to input 1) and mux 524e (set to input 0). The output of equalizers 504a and 504b are obtained using FIR (Finite Impulse Response) filtering operations (FIR blocks). As shown, the filter tap weights of equalizer 504a may be updated by comparing the FIR output of equalizer 504a with a pilot signal "PN1" and calculating the filter tap weights as previously described. Additionally, the filter tap weights of equalizer 504b may be updated by comparing the FIR output of equalizer 504b with a pilot signal "PN2" which is selected through mux 524b (set to 1) and calculating new filter weights as previously described. The FIR output of equalizer 504a may be received by descrambler/despreader 506a, which descrambles and despreads the signal as previously described and outputs a signal to a STTD and/or CLTD interface. Likewise, the FIR output of equalizer 504b may be received by descrambler/despreader 506b, which descrambles and despreads the FIR outputs of equalizer 504b and outputs a signal to the STTD and/or CLTD interface. The weight coefficients (filter tap weights) are calculated for both equalizers 504a and 504b as previously described.

Figure 7:
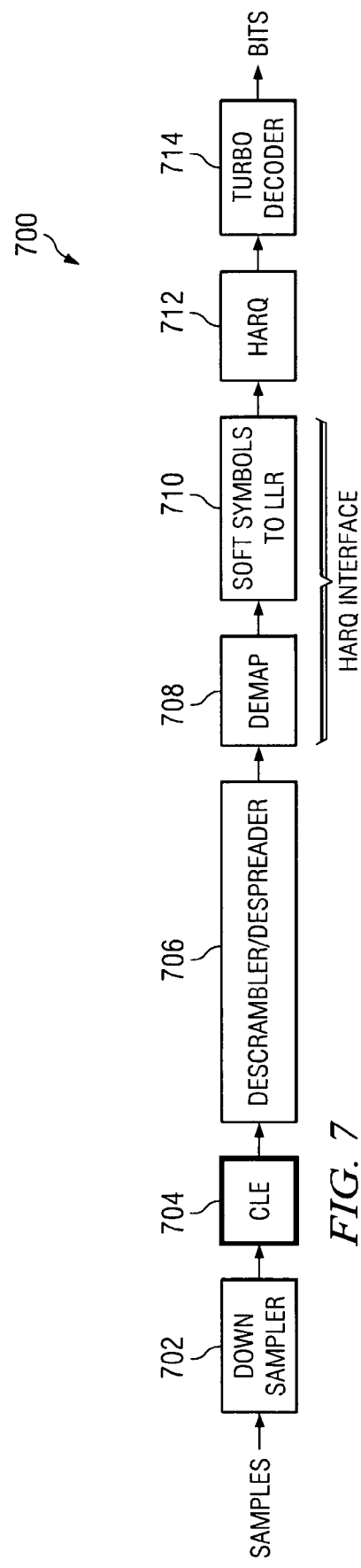
FIG. 7 shows a block diagram illustrating a method of receiving a wireless signal in accordance with embodiments of the invention.

FIG. 7 is a block diagram illustrating a receiving system 700 in which a reconfigurable CLE may implemented. Specifically, the receiving system 700 is illustrative of a HSDPA receiving architecture. As shown in FIG. 7, the receiving system 700 may comprise a downsampler 702, a CLE 704, a descrambler/despreader 706, a demapper 708, LLR conversion block 710, a HARQ 712, and a turbo decoder 714.

As previously explained, the downsampler 702 resamples the input at a lower sampling rate, (e.g., resample every $4^{th}$ or $8^{th}$ input sample) and outputs a signal to the CLE 704. The CLE 704 restores orthogonality by adaptively filtering the received signal and passes the "equalized" signal to descrambler/despreader block 706 which descrambles and despreads the signal from the CLE 704 as previously described. In at least some embodiments, the CLE 704 is a reconfigurable CLE 500 as previously described. The demap block 708 converts the data to soft symbols. The Log Likelihood Ratio (LLR) block 710 receives the soft symbols from demap block 708 and converts them to LLR format. The process of converting the data to LLR format also saves that data in memory, thereby allowing the HARQ 712 to asynchronously read blocks of data. The combined function of the HARQ 712 and the turbo decoder 714 preferably may be to recognize when errors are present in the received data and request retransmission. Specifically, the Hybrid Automatic Repeat Request (HARQ) 712 stores data coming from the equalizer, while the function of the turbo decoder 714 is to decode the data. The HARQ 712 and the turbo decoder 714 may request retransmission of data until a combination of old data and new data provide an error free data stream.

Figure 8:
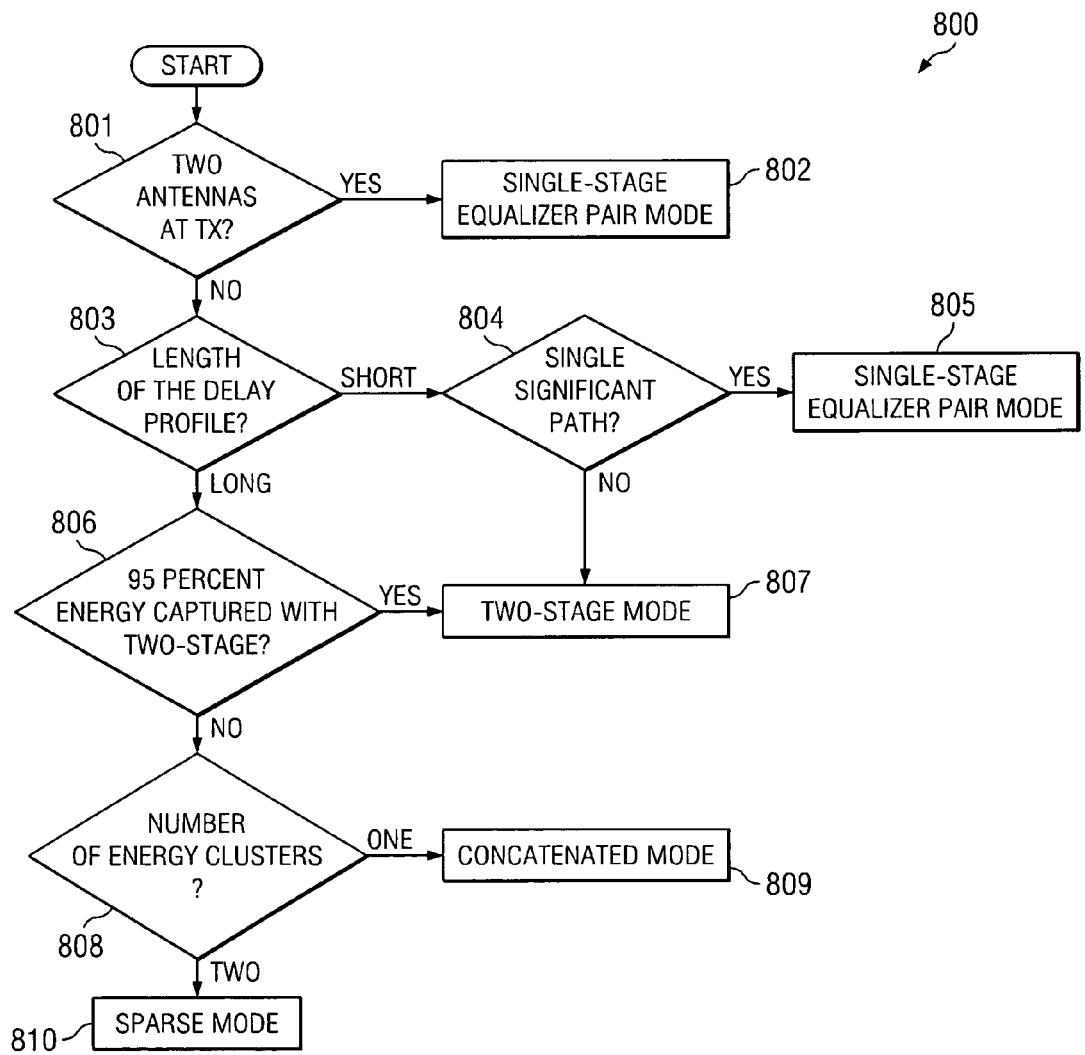
FIG. 8 shows a block diagram illustrating a method of selecting a mode of a reconfigurable chip level equalizer in accordance with embodiments of the invention.

FIG. 8 shows a block diagram illustrating a method 800 of selecting an operating mode of a reconfigurable CLE (e.g., reconfigurable CLE 500). As shown in FIG. 8, the method 800 may comprise determining the number of antennas of a tranmsitter at block 801. If there is more than one antenna at the transmitter, then a single-stage equalizer pair mode is preferably selected (block 802).

Otherwise, the method 800 may continue by determining the length of the multi-path delay profile at block 803. If the length of the multi-path delay profile is short (i.e., if the length is less than the number of taps of a single adaptive equalizer), and there is a single significant path as determined by block 804 (i.e., if a single sub-signal contains most of the total energy of a multi-path signal), then a single-stage equalizer mode may be used (block 805).

The method 800 selects a two-stage equalizer mode (block 807) if there is one antenna at the transmitter (determined at block 801), the length of the multi-path delay profile is short at previously described (determined by block 803), and there is not a single significant path as determined by block 804. The method 800 also selects the two-stage equalizer mode at block 807 when there is one antenna at the transmitter (determined at block 801), the length of a multi-path delay profile is long (i.e., if the length is more than the number of taps required for a single adaptive equalizer) as determined by block 803, and ninety-five percent of the total multi-path energy may be captured (determined by block 806) using the two-stage mode of block 807.

If there is one antenna (determined at block 801), the length of the multi-path delay profile is long (determined at block 803), and ninety-five percent of the total energy of a multi-path signal is not capturable (determined at block 806), then the number of energy clusters in the multi-path signal is determined at block 808. If there is one energy cluster, a concatenated equalizer mode is selected at block 809. If there is more than one energy cluster, a sparse equalizer mode is selected at block 810. Details regarding the single-stage equalizer pair, the single-stage equalizer, the two-stage equalizer, the concatenated equalizer, and the sparse equalizer are described above.

The above discussion is meant to be illustrative of the principles and various embodiments of the present invention. Numerous other variations and modifications will become apparent to those skilled in the art once the above disclosure is fully appreciated. It is intended that the following claims be interpreted to embrace all such variations and modifications.

What is claimed is:

1. An apparatus, comprising:
   two or more adaptive equalizers;
   a plurality of operation blocks that interconnect the adaptive equalizers;
   a first control mechanism that configures the adaptive equalizers and the plurality of operational blocks according to different signal delay profiles;
   a second control mechanism that disables at least one of said plurality of operational blocks according to the different signal delay profiles; and
   a third control mechanism that disables a computation resource of at least one of said adaptive equalizers according to the different delay profiles.

2. The apparatus of claim 1 wherein each of said two or more adaptive equalizers comprise a computational resource.

3. The apparatus of claim 2 wherein the computation resource comprises at least one item selected from the group consisting of: a summer, a conjugation block, a multiplier, and a divider.

4. The apparatus of claim 1 wherein said operational blocks comprise at least one item selected from the group consisting of:
   a signal regenerator;
   a delay line; and
   a summer.

5. The apparatus of claim 1 wherein the different signal delay profiles comprise at least one multi-path signal profile selected from the group consisting of:
   sub-signals that arrive to the apparatus in consecutive chip time units;
   sub-signals wherein one sub-signal comprises a substantial amount of total energy of the sub-signals;
   sub-signals that do not arrive to the apparatus in consecutive chip time units;
   sub-signals that arrive to the apparatus in two or more clusters;
   sub-signals that arrive to the apparatus from more than one antenna.

6. The apparatus of claim 1 wherein a two-stage configuration of the apparatus comprises a default mode.

7. An apparatus, comprising:
   two or more adaptive equalizers;
   a plurality of operation blocks that interconnect the adaptive equalizers;
   a first control mechanism that configures the adaptive equalizers and the plurality of operational blocks according to different signal delay profiles;
   a second control mechanism that disables at least one of said plurality of operational blocks according to the different signal delay profiles; and
   a third control mechanism that disables a computation resource of at least one of said adaptive equalizers according to the different delay profiles, the first, second, and third control mechanisms comprise multiplexers that receive control signal according to the different delay profiles.

8. A method, comprising:
   receiving a multi-path signal profile;
   determining attributes of the multi-path signal profile, comprising determining an amount of energy in a single sub-signal of the multi-path profile if the length of the multi-path signal profile is less than a maximum number of taps of a single adaptive equalizer; and
   operating two or more adaptive equalizers, computational resources of the two or more adaptive equalizers, and operational blocks interconnecting said two or more adaptive equalizers according to said attributes of the multi-path signal profile.

9. The method of claim 8 wherein determining attributes of the multi-path signal profile comprises determining a number of antennas at a transmitter, and determining a delay length of the multi-path signal profile if said number of antennas is equal to one.

10. The method of claim 8 wherein determining attributes of the multi-path signal profile comprises determining an amount of energy capturable by a two-stage adaptive equalizer if said length of the multi-path signal profile requires more than the maximum number of taps of a single adaptive equalizer.

11. The method of claim 10 wherein determining attributes of the signal comprises determining a number of energy clusters of the multi-path signal profile if the amount of energy capturable by a two-stage adaptive equalizer is less than around ninety-five percent of total energy of the multi-path signal profile.

12. The method of claim 8 further comprising disabling at least one selected from the group:
 adaptive equalizer;
 operational block; and
 computational resource.

13. A system comprising:
 two or more adaptive equalizers;
 a plurality of operational blocks;
 a means for selectively interconnecting the two or more adaptive equalizers and the plurality of operational blocks according to the attributes of a signal profile; and
 a means for disabling a computation resource of at least one of the two or more adaptive equalizers according to said attributes of the signal profile, the means for selectively interconnecting and the means for disabling comprising a plurality of multiplexers.

14. The system of claim 13 further comprising means for disabling at least one of the plurality of operational blocks according to said attributes of the signal profile.

15. The system of claim 13 further comprising means for sharing computational resources of the two or more adaptive equalizers.

16. The system of claim 13, wherein the attributes of the signal profile comprise at least one selected from the group consisting of:
 a number of antennas that transmitted the multi-path signal;
 a length of the multi-path signal profile;
 an amount of energy in a single sub-signal of the multi-path signal;
 an amount of capturable energy by a number of adaptive equalizers; and
 a number of energy clusters.

* * * * *